May 15, 1951 — N. J. HYATT — 2,553,373
BOTTLE HANDLING APPARATUS
Filed July 20, 1949 — 5 Sheets-Sheet 5
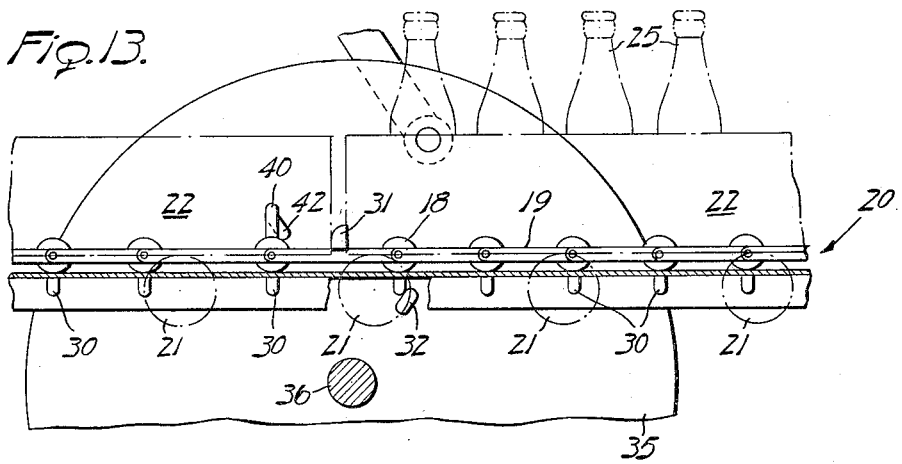
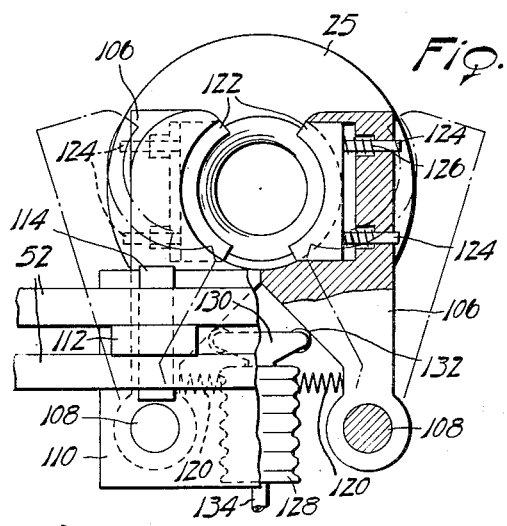
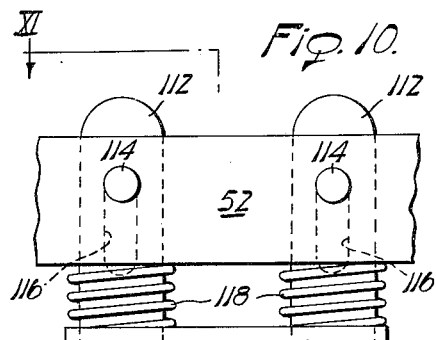
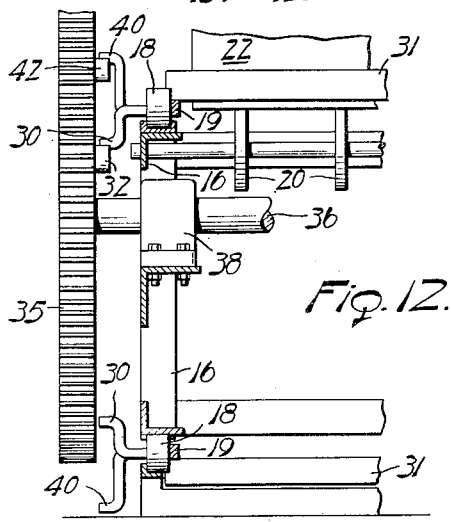
INVENTOR
Norman J. Hyatt
BY
Bean, Brooks, Buckley & Bean
ATTORNEYS Patented May 15, 1951

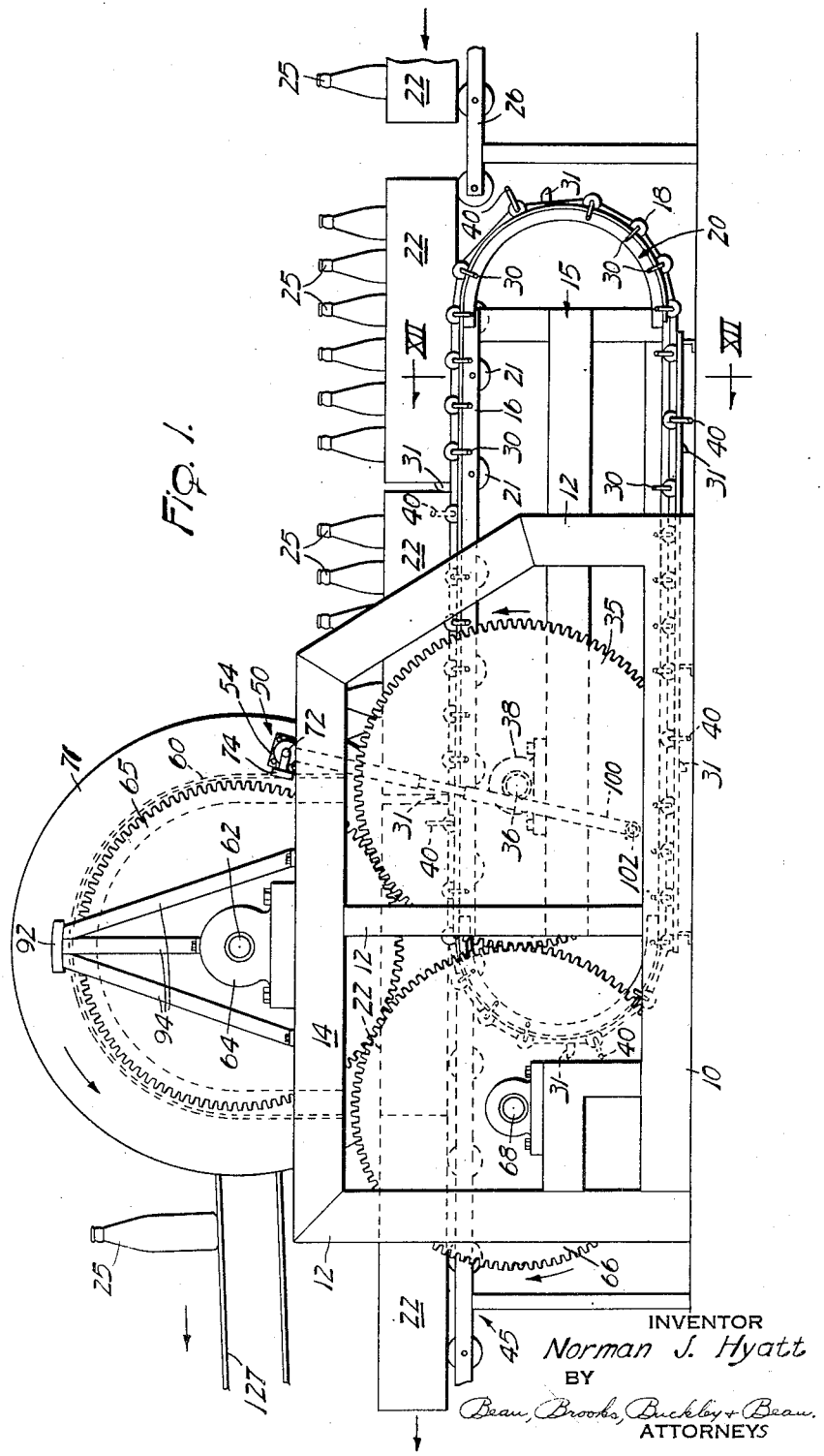

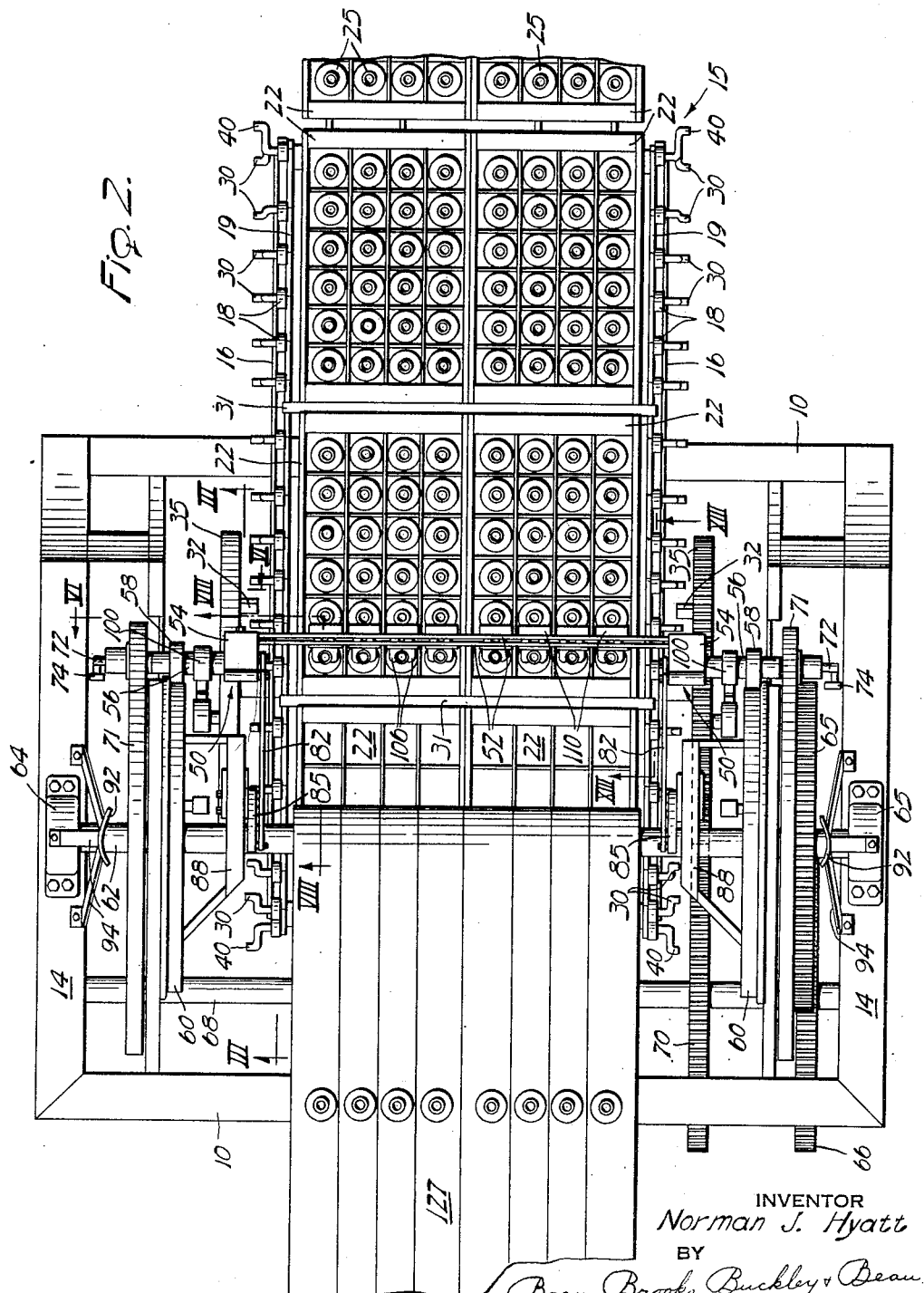

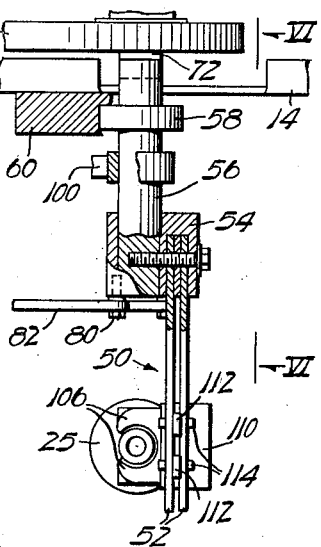
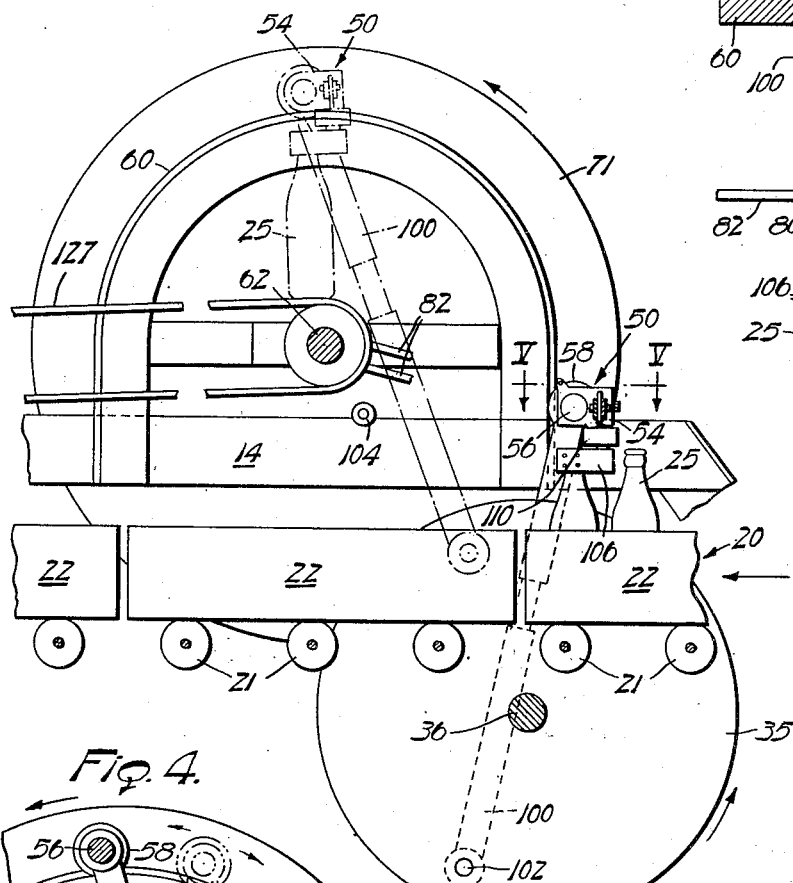
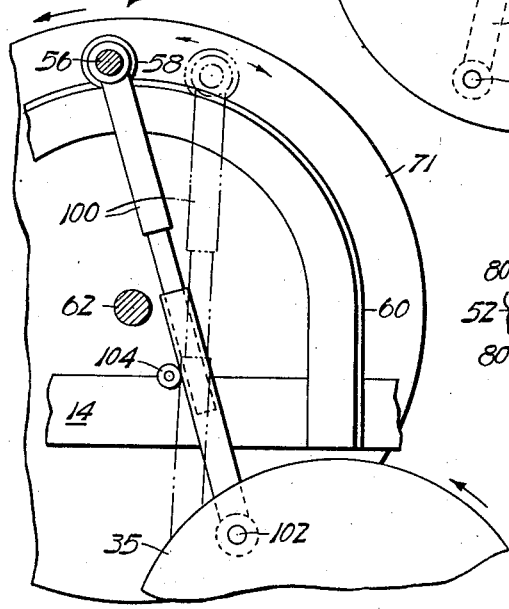
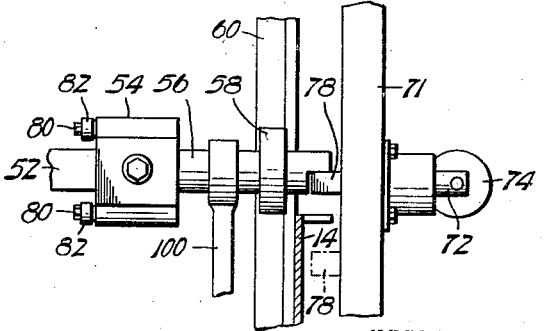

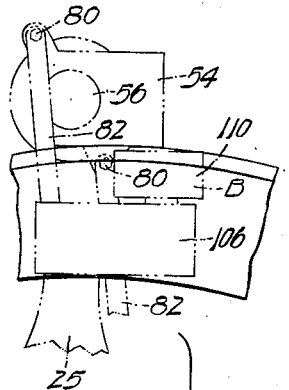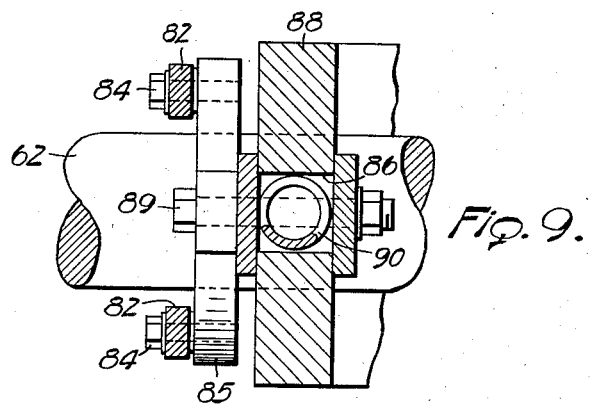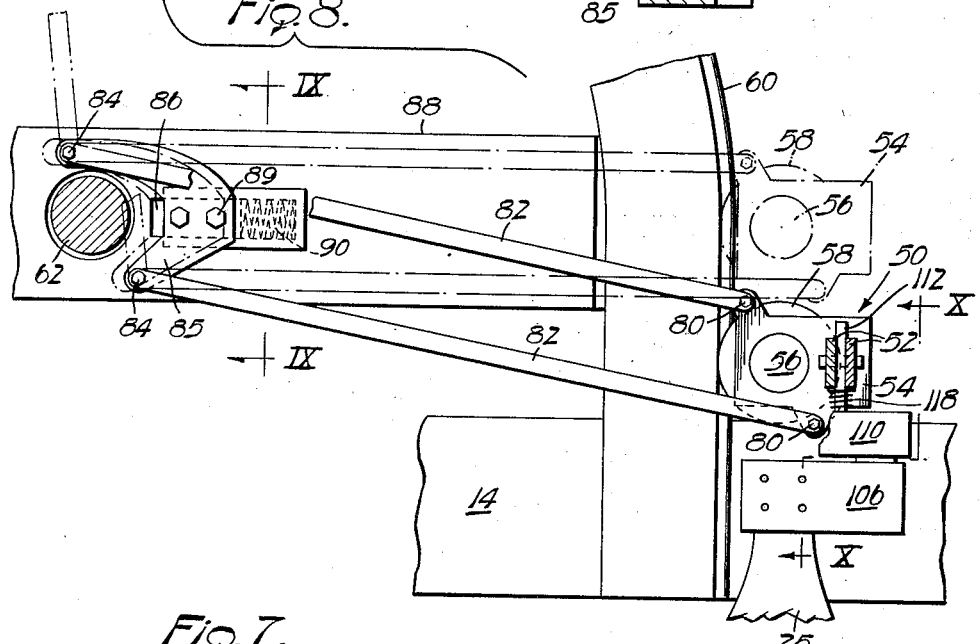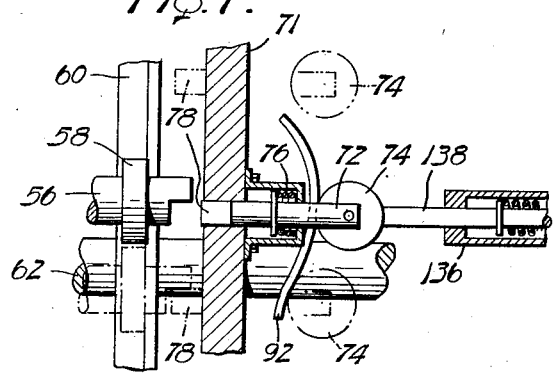

2,553,373

UNITED STATES PATENT OFFICE 2,553,373

BOTTLE HANDLING APPARATUS

Norman J. Hyatt, Williamsville, N. Y.

Application July 20, 1949, Serial No. 105,740

9 Claims. (Cl. 214—1.1)

1

This invention relates to improvements in machines for transferring grouped articles such as beverage bottles and the like, and more particularly to an improved machine for unloading such bottles in group lots from carrying cases and depositing the same upon a continuously traveling conveyor belt portion of a bottle washing machine or the like.

One of the objects of the invention is to provide a fully automatically operating machine including a conveyor mechanism to which case loads of bottles or the like may be unloaded from a transport vehicle, whereby the cased bottle lots are fed consecutively into the machine whereupon the bottles are lifted out of the cases by other elements of the machine and then deposited upon another continuously running conveyor element of the machine in improved manner for discharge therefrom into a bottle washer or other processing equipment forming no part of the present invention.

Another object of the invention is to provide a power driven machine adapted to engage under the mouth rim portion of a vertically standing bottle and to transport the same in an arcuate path beginning in a vertical direction and terminating horizontally while at all times maintaining the bottle in a vertical attitude, and finally releasing the bottle in upstanding position upon a horizontally moving conveyor without dropping the bottle while moving it horizontally in synchronism with the conveyor at the time of bottle release.

Another object of the invention is to provide a machine of utmost mechanical simplicity embodying the features and advantages aforesaid. Other objects and advantages of the invention will appear in the specification hereinafter.

In the drawings:

Fig. 1 is a side elevational view of a machine of the invention;

Fig. 2 is a top plan thereof;

Fig. 3 is a fragmentary sectional view taken along line III—III of Fig. 2;

Fig. 4 is a duplicate view of a portion of the mechanism of Fig. 3, showing operative elements in different actuating positions;

Fig. 5 is a fragmentary sectional view, on an enlarged scale, taken along line V—V of Fig. 3;

Fig. 6 is a fragmentary section, on an enlarged scale, taken along line VI—VI of Fig. 2;

Fig. 7 is a fragmentary sectional view through a detail of the operating mechanism;

Fig. 8 is a fragmentary sectional view, on an enlarged scale, taken along line VIII—VIII of Fig. 2;

2

Fig. 9 is a fragmentary section, on an enlarged scale, taken along line IX—IX of Fig. 8;

Fig. 10 is a fragmentary combination elevational and sectional view taken along line X—X of Fig. 8;

Fig. 11 is a combination top plan and sectional view taken along line XI—XI of Fig. 10;

Fig. 12 is a fragmentary section, on an enlarged scale, taken along line XII—XII of Fig. 1; and Fig. 13 is a fragmentary sectional view taken along line XIII—XIII of Fig. 2.

In the drawing, the machine of the invention is illustrated to include a frame structure consisting of sills 10, uprights 12 and top rails 14. A second frame 15 is disposed within the main frame and mounts a pair of endless rails 16—16 upon which run rollers 18 interconnected by links 19 comprising opposite side elements of an endless drag conveyor 20. The upper portions of the upper levels of the frame rails 16 rotatably mount a series of parallel rollers 21 to extend transversely of the upper strand of the drag conveyor, and the rollers 21 are arranged to support thereon the cases 22 carrying the bottles 25 to be handled by the machine. As illustrated in Fig. 1, the conveyor frame 15 may be conveniently dimensioned so as to co-operate with a gravity operated roller conveyor structure as indicated at 26 which leads from the empty bottle transport discharge station. Thus, the cases of bottles may be deposited upon the conveyor 26 at the time of unloading from a truck or the like, whereupon they will automatically feed onto the conveyor 15 as the drag elements thereof progressively displace previously fed bottle cases toward the left as viewed in Figs. 1 and 2 through the machine.

The drawings illustrate the machine to be constructed so as to simultaneously handle a double line of traveling bottled cases in side-by-side relation, but it will be appreciated that the principles of the machine are equally applicable to a single line arrangement or to any other multiple line arrangements. The conveyor drag link elements carry laterally projecting fingers 30 which are adapted to be consecutively engaged and pushed against by cam fingers 32—32 (Figs. 2, 12, 13) extending from gear wheels 35—35 disposed at opposite sides of the conveyor unit 20. The gears 35—35 are carried upon a drive shaft 36 journaled in bearing blocks 38 (Figs. 1-12) mounted on the frame of the conveyor 20; and the gears 35—35 are arranged to be rotated as will be described hereinafter whereby during each cycle of rotation of the gears 35—35 the cams 32—32 thereof are carried thereby to move into bearing relation against oppositely disposed fingers 30—30 of the drag conveyor so as to force the latter to move to feed the bottle cases toward the left as viewed in Figs. 1–2 through a distance equal to the distance between longitudinal centers of successive transverse rows of bottles within the cases 22. Thus, the transverse rows of bottles are brought successively into registry with the bottle lifting apparatus of the machine which will be described hereinafter, at which time the continued rotation of the gears 35—35 causes the cam 32 thereof to slide out of contact with the conveyor fingers 30, thereby permitting the track conveyor mechanism to halt momentarily so that the bottle lifting mechanism may operate without interference following which operation the dogs 32—32 are again brought up by the continuous rotation of the gears 35 so as to engage the next following pair of conveyor fingers 30 for camming the latter so as to cause the conveyor to move forwardly through the next step of conveyor operation for bringing the next succeeding transverse row of bottles into registry with the bottle lifting mechanism.

Thus, it will be appreciated that the fingers 30 on the track conveyor structure will be spaced longitudinally of the conveyor in such manner that the dogs 32 will engage the conveyor intermittently for moving it in step-by-step manner as is required to bring successive transverse rows of bottles into registry with the bottle lifting station of the machine, and to thereupon halt momentarily to permit the bottle lifting apparatus to engage the top rims of the bottles and to lift them free from the cases before the conveyor starts again to move the cases to bring the next row of bottles into position at the bottle lifting station. At intervals longitudinally of the drag conveyor mechanism upstanding transverse bars 31 are provided in relatively spaced relation longitudinally of the conveyor structure in accord with the length dimensions of the bottle cases 22 so that the bars 31 will be interspaced between successive bottle cases for pushing the cases and controlling their movements into the machine as will be explained hereinafter.

To accommodate the conveyor actuation process to the increased longitudinal distance between the last row of bottles in one case and the first row of bottles in the next succeeding case, the conveyor is provided at suitable intervals with upstanding fingers 40 and the gear wheels 35 are provided with secondary dogs 42 (Figs. 12, 13) and the dog and finger arrangements are so constructed and arranged that following movement of each case into position under the case unloading station so that the last row of bottles may be engaged by the lifting mechanism, the next step of conveyor movement is procured by camming coaction of the dogs 42 with the fingers 40 whereby the conveyor is displaced throughout a greater than usual distance so as to bring the first row of bottles of the next succeeding case into position under the bottle lifting station. Adjacent the left hand end portion of the conveyor unit 20 a second gravity conveyor 45 is disposed in alignment with the controlled conveyor unit 20, for rolling support of the emptied cases 22 after they pass the unloading station of the machine and are freed from the conveyor bars 31 of the unit 20. The empty cases thereupon roll freely down the conveyor section 45 to any convenient disposal point.

The bottle lift mechanism includes a lifting head designated generally at 50 which includes a pair of parallel support bars 52—52 mounted at their opposite ends upon parallel head blocks 54. The head blocks 54—54 are each in turn mounted upon stub shafts 56 carrying rollers 59 upon a cam track 60, and comprises at each side of the machine a bent angle stop piece mounted upon the top plates 14—14 of the machine frame, and the upper portions of the cam tracks are shaped to be concentric of the shaft 62 which is mounted transversely of the machine frame by means of bearing blocks 64. At one end of the shaft 62 it mounts a gear wheel 65 which meshes with a drive gear 66 (Figs. 1–2) keyed to the machine drive shaft 68. The shaft 68 also mounts a gear 70 (Fig. 2) which meshes with one of the conveyor gears 35, whereby upon rotation of the drive shaft 68 the conveyor gears 35—35 are both driven to rotate as well as the shaft 62. At opposite sides of the machine the shaft 62 carries a wheel 71. Each of the wheels 71—71 carries a keeper pin 72 which mounts a roller 74 at its outer end. A compression spring 76 is arranged upon the wheel 71 (Fig. 7) so as to bias the keeper pin inwardly so that its inner end 78 tends to interfere with the outer end of the corresponding stub shaft 56 from the lift head block. The lift head blocks 54—54 are each formed with diametrically opposite horn portions carrying pivot pins 80—80 (Fig. 8) upon which are mounted the ends of a pair of parallel links 82—82 which connect at their other ends by means of pins 84—84 upon a bracket 85 arranged in such manner that the pivot pins 84—84 are approximately concentric of the shaft 62. To this end the bracket 85 is slidably carried upon a slotted portion 86 of a machine frame piece 88 by means of a pin and slide block device 89 backed up by a compression spring 90.

Thus, the lifting head apparatus includes a structural swinging frame element comprising the parallel arms 82, the head blocks 54, and cross bars 52, which is adapted to oscillate vertically upon the pivot pins 84 between the solid line and broken line positions thereof as shown in Figs. 3 and 8, while the parallel arms 82—82 operate automatically to at all times maintain the head blocks 54—54 and the cross bars 52 in the same upright attitude thereof, as illustrated. During such movement of the swinging frame structure it is guided by means of the rollers 58 operating against the cam track 60, and although the major portion of the cam track 60 between the loading and unloading stations is concentric of the shaft 62, the lower portion of the cam track deviates from concentricity and is directed straight vertically to facilitate initial purely vertical lifting of the bottles 25 out of the cases 22. To accommodate this deviation of movement of the lifting head from a path concentric to the shaft 62, the sliding block and bracket arrangement 85—89 goes into operation.

Adjacent the topmost level of the cam track 60 a cam plate 92 is mounted rigidly upon the machine frame by means of struts 94 (Figs. 1 and 7) and the plates 92—92 are so shaped and arranged as shown in Fig. 7 as to engage the rollers 74 so as to forcibly retract the keeper pins 72 from engagement with the lift head stub shafts 56 whenever the keeper rollers roll onto the high points of the cam tracks 92—92. A pitman rod 100 is arranged at each end of the lift head 50, being pivotally connected thereat and extending downwardly therefrom into corresponding pivotal connections at 102 to the wheel 35. Thus, as the wheel 35 rotates the member 100 functions as a connecting rod to alternately raise and lower the lifting head 50 in an arcuate path defined along the cam track surface 60 between the solid line and broken line positions of the lift head 50 as illustrated in Fig. 3. However, as explained hereinabove the keeper pins 78—78 are normally disposed to extend into coacting relation with the stub shafts 56 for bearing against the latter so as to assist in lifting the load every time the wheel 71 revolves into position so that the keeper pins 78 come into abutment under the stub shafts 56. Then, when the keeper pins 78 are released from the stub shafts at the upper end position of travel as explained hereinabove, the lifting head is thereby freed to be returned to its reloading position in response to the forces of gravity under control of the arm 100 as the wheel 35 continues its rotation.

The lifting head 50 mounts a series of bottle neck grip devices as illustrated for example in detail at Figs. 10-11. As shown therein each grip device comprises a pair of jaws 106—106 which are pivotally mounted as indicated at 108—108 upon a base plate 110 which subtends a pair of pins 112—112 (Fig. 10). The pins 112—112 are mounted to extend vertically and in slide-fitting relation between the lift head parallel bars 52—52, and are maintained thereon by means of pins 114—114 which extend transversely between the bars 52—52 and through slotted apertures 116—116 formed in the pins 112—112. Compression springs 118—118 encircle the pins 112—112 and are arranged between the base plate 110 and the bars 52—52 so as to normally maintain the assembly in the position thereof shown in Fig. 10. However, it will be appreciated that in event the grip device meets an obstruction or interference for example with the top end portion of a bottle 25 during a lifting head lowering operation, the springs 118 will cushion the interference forces and otherwise permit inequality adjustments between the grip device and the bottle necks, as will be explained hereinafter.

A tension spring 120 (Fig. 11) is supplied to interconnect the jaws 106—106 so as to bias the latter into bottle neck gripping positions from opposite sides thereof, and as indicated at 122 the jaws 106—106 are each furnished with arcuately shaped grip rims 122 which are mounted upon slip pins 124 and outwardly biased by compression springs 126 so as to tend to engage inwardly and under the bead portions of the bottle necks, as shown in Fig. 10. Thus, it will be appreciated that whenever the lifting head device descends into loading position the jaws 106—106 of each grip unit will be thereby forced downwardly over the necks of the bottles so that the grip rims 122 slipfit downwardly and into positions under the beaded portions of the bottle necks; the spring devices 120—126 momentarily retreating to permit this engagement action. Then, when the lifting head is subsequently raised as explained hereinabove the rims 122 lift upwardly under the bottle necks so as to elevate the bottles toward the unloading station as explained hereinabove.

To receive the bottles at the unloading station a horizontal conveyor 127 is arranged as illustrated in Figs. 1, 2, 3, with the tail pulley portion thereof conveniently mounted upon the shaft 62; the conveyor 127 being of course arranged to convey the unloaded bottles to any desired position for further treatment, and powered in any desired manner (not shown). The lift head and pitman rod and unloading conveyor devices are relatively arranged so that when the lift head 50 reaches the top limit of its upward movement, as indicated by the broken line position thereof in Fig. 3, the bottles 25 will be thereby suspended from the lift head in vertically hanging positions with their bottoms disposed in approximate contact with the conveyor 127. As explained hereinabove, the terminal phase of the elevating motion of the lift head 50 is in a substantially horizontal direction and in line with the direction of travel of the conveyor 127, whereby the bottles are arranged to be delivered to the conveyor in upright standing position and at the same elevation thereof while moving horizontally at the same speed thereof.

To release the bottles 25 from the lifting head 50 upon arrival of the bottles at the unloading position, any suitable means may be employed for opening the paired jaws 106—106. For example, as illustrated in Fig. 11 a Sylphon bellows 128 may be arranged in connection with each bottle grip unit so that the movable end portion 130 of the bellows is disposed between the jaws 106—106 so as to force the latter apart whenever the bellows are extended. Rollers 132—132 are preferably provided on the bellows member 130 so as to reduce the frictional bearing loss against the jaws. The conduit 134 is illustrated to lead away from the bellows to any suitable supply of fluid under pressure, the application of which to the bellows will of course be controlled automatically by operation of any suitable valve means actuated automatically upon arrival of the lifting head 50 to the unloading position.

Thus, it will be appreciated that the invention provides an improved bottle elevating and conveyor loading arrangement, and that although only one form of the invention has been shown and described in detail it will be apparent to those skilled in the art that the invention is not so limited but that various changes may be made therein without departing from the spirit of the invention or the scope of the appended claims.

I claim:

1. In a machine for gripping successive rows of bottles and lifting them out of containers and depositing them upon a horizontally moving conveyor, a lifting head member mounting a plurality of bottle neck gripping elements, swing arm means pivotally connected to said lifting head member at opposite ends thereof, curving cam track means adjacent opposite ends of said lifting head member for guiding the latter to move in a smoothly curving arcuate path terminating in vertically and horizontally directed portions, continuously rotating means carrying movable abutment devices adapted to engage said lift head member upon contact with the latter at one end portion of said cam track path and to forcibly displace said lift head member to move upwardly and along said cam track path to the horizontal end portion thereof whereupon said abutment means are automatically retracted by action of a fixed cam to release said lift head, said swing arm means being pivotally connected to a continuously rotating member and so constructed and arranged as to permit said displacing movement of said lifting head during engagement with said abutment members and operable upon retraction of said abutment members to pull upon said lifting head so as to withdraw it in reverse direction along said cam track path into bottle engaging position again, and means controlling said bottle gripping elements so as to cause them to open upon arrival of said lifting head at the horizontal end portion of said cam track path and to close upon arrival of said lifting head at the bottle engaging station thereof.

2. In a machine for gripping bottles and lifting them and depositing them upon a moving conveyor, a lifting head member mounting a bottle neck gripping device, swing arm means pivotally connected to said lifting head member, curving cam track means arranged to guide said lifting head member to move in a smoothly curving arcuate path between loading and unloading positions, rotating means carrying movable abutment means adapted to engage said lift head member upon contact with the latter at the loading position thereof and to forcibly displace said lift head member to move upwardly and along said cam track path to the unloading end portion thereof whereupon said abutment means are automatically disengaged to release said lift head, said swing arm means being pivotally connected to a continuously rotating member and so constructed and arranged as to permit said displacing movement of said lifting head during engagement with said abutment members and operable upon disengagement of said abutment means to pull upon said lifting head so as to retract it along said cam track path into loading position again, and means controlling said bottle gripping device so as to cause it to open upon arrival of said lifting head at the unloading portion of said cam track path and to close upon arrival of said lifting head at the loading station thereof.

3. In a machine for lifting successive rows of bottles out of containers and depositing them upon a horizontally moving conveyor, a lifting head member mounting a row of bottle neck gripping devices, swing arm means pivotally connected to said lifting head member, curving cam track means arranged to guide said lifting head member to move in a smoothly curving arcuate path between loading and unloading positions, rotating means carrying movable abutment means adapted to engage said lift head member upon contact with the latter at the loading portion of said cam track path and to forcibly displace said lift head member to move upwardly and along said cam track path to the unloading end portion thereof whereupon said abutment means are automatically retracted by action of cam means to release said lift head, said swing arm means being pivotally connected to a continuously rotating member and so constructed and arranged as to permit said displacing movement of said lifting head during engagement with said abutment members and operable upon retraction of said abutment means to pull upon said lifting head so as to retract it in reverse direction along said cam track path into loading position again, means controlling said bottle gripping devices so as to cause them to open upon arrival of said lifting head at the unloading portion of said cam track path and to close upon arrival of said lifting head at the bottle loading station thereof, and means for periodically shifting successive rows of bottles into position for engagement by said gripping devices.

4. In a machine for lifting bottles out of containers and feeding them to a processing station, a lifting head member mounting a bottle neck gripping device, curving cam track means arranged to guide said lifting head member to move in a smoothly curving arcuate path terminating in a vertically rising portion at the bottle loading station and a horizontally directed portion at the unloading station, means adapted to engage said lift head member periodically at said loading station and to forcibly displace said lift head member upwardly and along said cam track path to the horizontal unloading end portion thereof, means operable to pull upon said lifting head following each unloading operation so as to retract it in reverse direction along said cam track path into bottle loading position again, and means controlling said bottle gripping device so as to cause it to open upon arrival at the unloading station and to close upon arrival at said bottle loading station, and horizontal conveyor means arranged to receive bottles from said lifting head at said unloading station in upright disposed position thereon, said conveyor means having a rate of travel substantially equal to the travel rate of said lifting head in horizontal direction at the time of unloading.

5. In a machine for gripping successive rows of bottles and lifting them out of containers and depositing them upon a horizontally moving conveyor, a conveyor operating intermittently to feed containers of bottles to a loading station, a lifting head member mounting a bottle neck gripping device, curving cam track means arranged to guide said lifting head member to move in smoothly curving arcuate path commencing with a vertically rising portion at said loading station and a horizontally directed portion at the unloading station, continuously rotating means carrying movable abutment devices adapted to engage said lift head member upon contact with the latter at said loading station and to forcibly displace said lift head member to move upwardly and along said cam track path to the horizontal unloading end portion thereof whereupon said abutment means are automatically retracted by action of a fixed cam to release said lift head, means operable to pull upon said lifting head so as to retract it in reverse direction along said cam track path into bottle engaging position again, means controlling said bottle gripping device so as to cause it to open upon arrival of said lifting head at the unloading end portion of said cam track path and to close upon arrival of said lifting head at said bottle loading station, and conveyor means disposed to receive the bottles released by said lifting head at said unloading station and to convey them therefrom.

6. In a machine for gripping successive rows of bottles and lifting them out of containers and depositing them upon a horizontally moving conveyor, a lifting head member mounting a plurality of bottle neck gripping elements, swing arm means pivotally connected to said lifting head member at opposite ends thereof, curving cam track means adjacent opposite ends of said lifting head member for guiding the latter to move in a smoothly curving arcuate path terminating in vertically and horizontally directed portions, continuously rotating means carrying movable abutment devices adapted to engage said lift head member upon contact with the latter at one end portion of said cam track path and to forcibly displace said lift head member to move upwardly and along said cam track path to the horizontal end portion thereof, means causing said abutment means to automatically retract to release said lift head when at an elevated unloading position, said swing arm means being pivotally connected to a continuously rotating member and so constructed and arranged as to permit said displacing movement of said lifting head during engagement with said abutment members and operable upon retraction of said abutment members to control said lifting head so as to withdraw in reverse direction along said cam track path into bottle engaging position again, and means controlling said bottle gripping elements so as to cause them to open upon arrival of said lifting head at the horizontal end portion of said cam track path and to close upon arrival of said lifting head at the bottle engaging station thereof.

7. In a machine for gripping bottles and lifting them and depositing them upon a moving conveyor, a lifting head mmeber mounting a bottle neck gripping device, swing arm means pivotally connected to said lifting head member, curving cam track means arranged to guide said lifting head member to move first upwardly and then horizontally in an arcuate path between loading and unloading positions, means adapted to intermittently engage said lift head member at the loading position thereof and to forcibly displace said lift head member to move along said cam track path to the unloading end portion thereof whereupon said engagement is automatically terminated to release said lift head, said swing arm means being pivotally connected to a continuously rotating member and so constructed and arranged as to permit said displacing movement of said lifting head and operable upon disengagement thereof to control said lifting head so as to retract along said cam track path into loading position again, and means controlling said bottle gripping device so as to cause it to open upon arrival of said lifting head at the unloading portion of said cam track path.

8. In a machine for lifting successive rows of bottles out of containers and depositing them upon a horizontally moving conveyor, a lifting head member mounting a row of bottle neck gripping devices, curving cam track means arranged to guide said lifting head member to move in a smoothly curving arcuate path between loading and unloading positions, rotating means carrying movable abutment means adapted to engage said lift head member upon contact with the latter at the loading portion of said cam track path and to forcibly displace said lift head member to move upwardly and along said cam track path to the unloading end portion thereof whereupon said abutment means are automatically retracted by action of cam means to release said lift head to retract in reverse direction along said cam track path into loading position again, means controlling said bottle gripping devices so as to cause them to open upon arrival of said lifting head at the unloading portion of said cam track path, and means for periodically shifting successive rows of bottles into position for engagement by said gripping devices.

9. In a machine for gripping successive rows of bottles and lifting them out of containers and depositing them upon a horizontally moving conveyor, a conveyor operating intermittently to feed containers of bottles to a loading station, a lifting head member mounting a bottle neck gripping device, curving cam track means arranged to guide said lifting head member to move in smoothly curving arcuate path commencing with a vertically rising portion at said loading station and a horizontally directed portion at the unloading station, continuously rotating means carrying movable abutment devices adapted to engage said lift head member upon contact with the latter at said loading station and to forcibly displace said lift head member to move upwardly and along said cam track path to the horizontal unloading end portion thereof whereupon said abutment means are automatically retracted by action of a fixed cam to release said lift head to retract in reverse direction along said cam track path into bottle engaging position again, and conveyor means disposed to receive the bottles released by said lifting head at said unloading station and to convey them therefrom.

NORMAN J. HYATT.

REFERENCES CITED

The following references are of record in the file of this patent:

UNITED STATES PATENTS

| Number | Name | Date |
|---|---|---|
| 1,869,622 | Rowe | Aug. 2, 1932 |
| 2,431,265 | Madsen et al. | Nov. 18, 1947 |